US012502799B2

(12) United States Patent
Chang et al.

(10) Patent No.: US 12,502,799 B2
(45) Date of Patent: Dec. 23, 2025

(54) SCISSOR SHEATH

(71) Applicants: C. Jet INTL CO., LTD., Taichung (TW); SIE CHANG CUTTING TOOLS CO., LTD., Taichung (TW)

(72) Inventors: Yin-Chi Chang, Taichung (TW); Hsin-Chih Lin, Taichung (TW)

( * ) Notice: Subject to any disclaimer, the term of this patent is extended or adjusted under 35 U.S.C. 154(b) by 280 days.

(21) Appl. No.: 18/341,610

(22) Filed: Jun. 26, 2023

(65) Prior Publication Data

US 2024/0424703 A1 Dec. 26, 2024

(51) Int. Cl.
*B26B 29/04* (2006.01)

(52) U.S. Cl.
CPC .................................... *B26B 29/04* (2013.01)

(58) Field of Classification Search
CPC ...................................................... B26B 29/04
See application file for complete search history.

(56) References Cited

U.S. PATENT DOCUMENTS 6,854,184 B2 * 2/2005 DiPalma ................. B26B 13/00 30/151
D802,296 S * 11/2017 Cosignani ....................... D3/220
D1,076,640 S * 5/2025 Lin ................................ D8/322
2004/0158993 A1 * 8/2004 Hasegawa ............... B26B 29/04 30/151
2020/0108518 A1 * 4/2020 Fountain ................. B26B 29/04
2024/0424703 A1 * 12/2024 Chang ...................... B26B 29/04

FOREIGN PATENT DOCUMENTS

CN 108673570 A * 10/2018
GB 2254244 A * 10/1992 ............. B26B 29/04
TW M471971 U * 2/2014
TW M648480 U * 11/2023
TW 1841400 B * 5/2024

OTHER PUBLICATIONS

English translation of CN-108673570-A, dated Oct. 19, 2018.*

* cited by examiner

*Primary Examiner* — Hwei-Siu C Payer
(74) *Attorney, Agent, or Firm* — Egbert, McDaniel & Swartz, PLLC

(57) ABSTRACT

Disclosed is a scissor sheath, including a sheath and a support frame, wherein the sheath is a shell-like structure that creates an interior chamber. The sheath has two side parts, and each side part forms a chute. Each of the chutes stretches to the back edge of each corresponding side part. The support frame includes a base, two support arms and two pins, wherein the base connects each of the support arms, each of the pins is connected to each of the support arms, and the pins are laterally opposite each other. Each pin enters each chute, the sheath is erected on the top edge of an installation surface, and the supporting frame leans against the installation surface to provide support for the sheath.

9 Claims, 7 Drawing Sheets

SCISSOR SHEATH

CROSS-REFERENCE TO RELATED U.S. APPLICATIONS

Not applicable.

BACKGROUND OF THE INVENTION

1. Field of the Invention

The present invention relates generally to an accessory for sheathing scissors, and more particularly to a scissor sheath.

2. Description of Related Art Including Information Disclosed Under 37 CFR 1.97 and 37 CFR 1.98

The scissor in the present invention includes cutters for cutting objects and shearers for shearing objects. The scissor comprises an operating part and a working part, wherein the operating part is provided for the user's gripping operation, and the working part is used for cutting or shearing the object. When the scissor is not in use, the working part shall be sheathed in a sheath. The sheath is a sleeve with a socket, and the working part is inserted into the sheath through the socket. The sheath wraps the working part to prevent the working part from being directly damaged by foreign objects. When the scissor is not in use, the user is unable to touch the working part inserted into the sheath, so as to avoid the working part cutting or pricking the user, the safety of the scissor not in use is enhanced.

The thickness of the scissor is usually smaller than its width. When the scissor is sheathed in the sheath and placed on the top of a work table or a display table, one side of the scissor and the sheath leans downwards on the table top. As such, the operating part of the scissor and the side of the sheath facing the table top are difficult to be observed visually, and the static display is insufficient.

BRIEF SUMMARY OF THE INVENTION

The primary object of the present invention is to provide a scissor sheath.

Based on said purpose, the technical characteristic of problem solving of the present invention is that the scissor sheath comprises a sheath for sheathing the working part of a scissor. The sheath is a shell-like structure with a chamber formed inside. Said chamber extends to the back end of the sheath, so that the working part is inserted into said chamber from the back end of the sheath. The sheath has two side parts. The side parts are opposite to each other and located on both sides of said chamber respectively. Each side part forms a chute, and the chutes extend to the outer side of the side parts far from said chamber respectively to open to the outside. The chutes extend to the back edge of the side parts respectively.

The scissor sheath has a support frame, including a base, two support arms and two pins, wherein the base connects the support arms, and the support arms are laterally opposite to each other. The pins are connected to the support arms respectively, are laterally opposite to each other, and the pins are oppositely close to each other.

The pins enter the chutes respectively, so that the sheath is erected on the top edge of an installation surface, and the support frame leans against the installation surface to support the sheath. The main effect and advantage of the present invention are that it can firmly forms an upright installation state, improving the static display effect of the scissor.

DETAILED DESCRIPTION OF THE INVENTION

Figure 1:
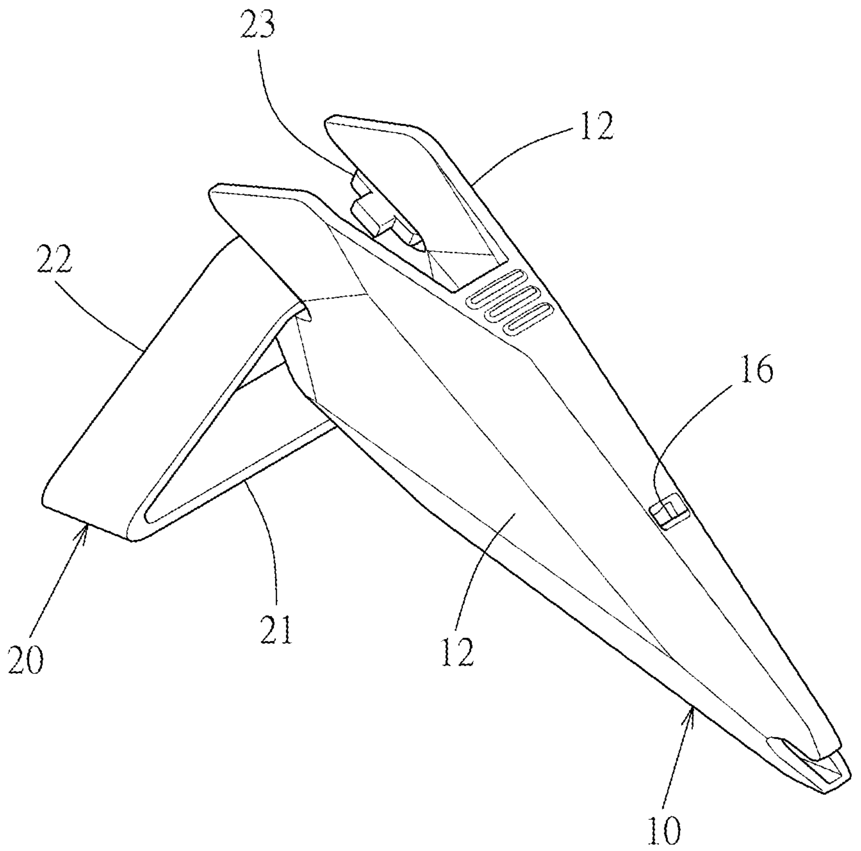
FIG. 1 is a perspective view of a preferred embodiment of the present invention.
Figure 2:
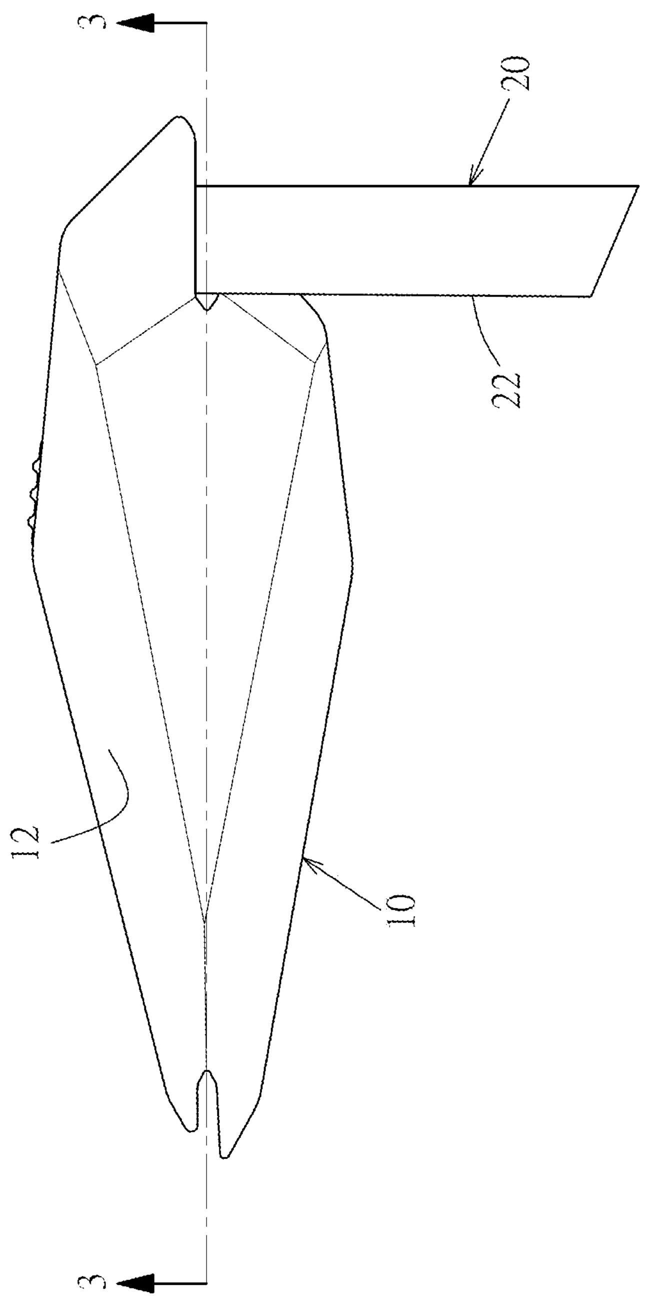
FIG. 2 is a right side view of a preferred embodiment of the present invention.
Figure 3:
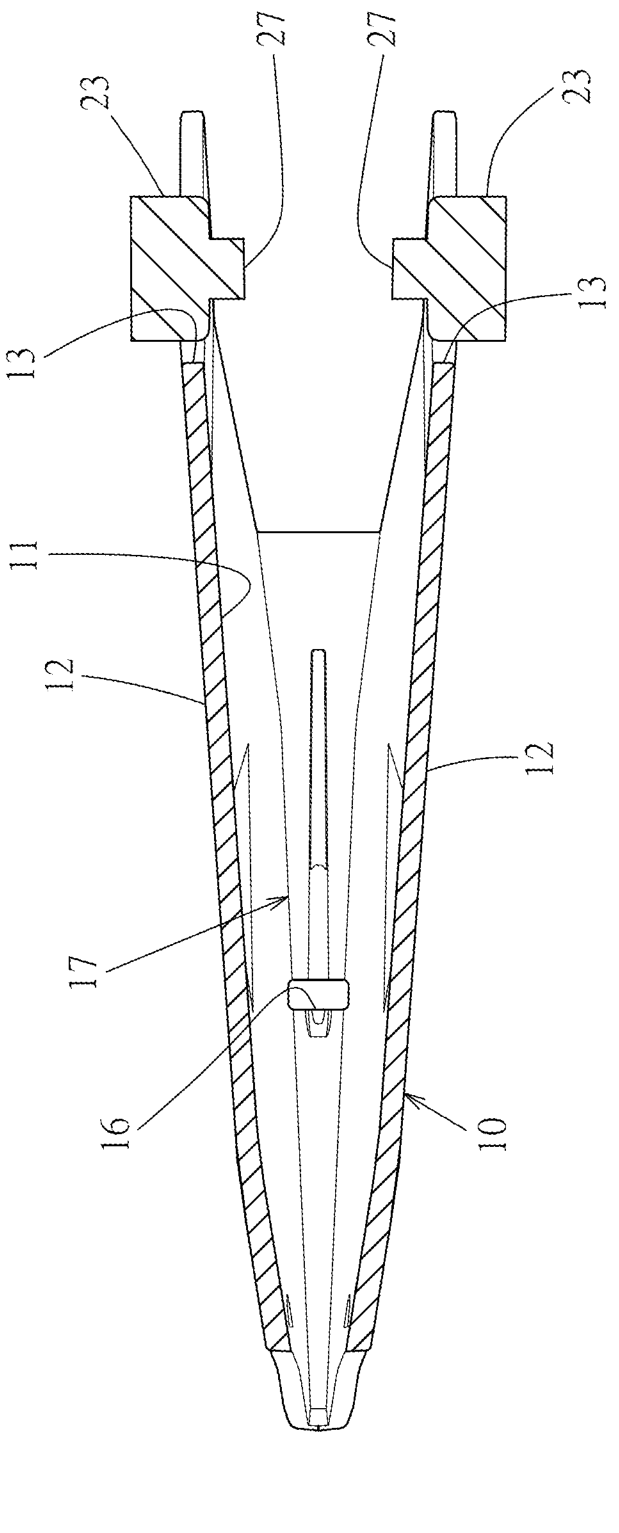
FIG. 3 is the 3-3 sectional view of FIG. 2.
Figure 4:
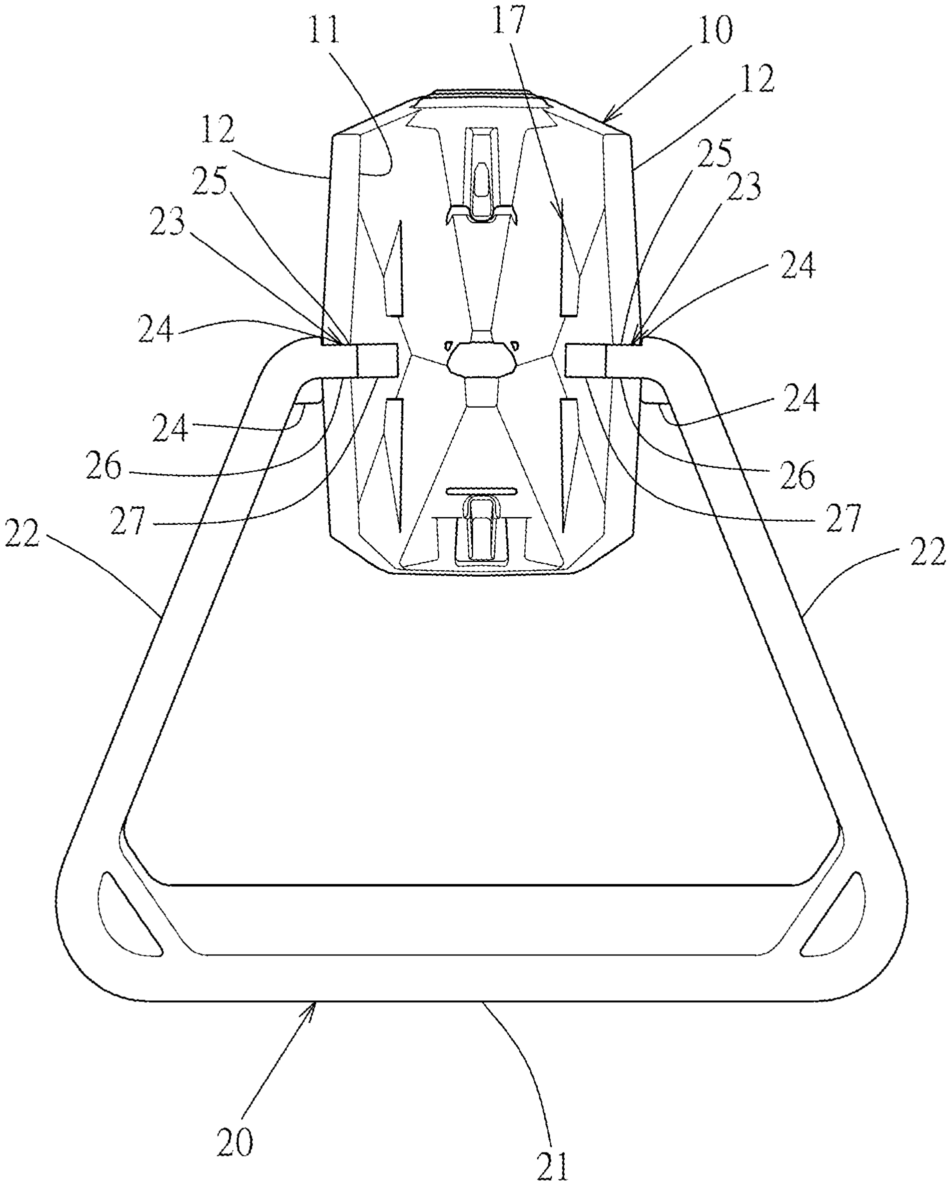
FIG. 4 is a back side view of a preferred embodiment of the present invention.

Please refer to the figures for the preferred embodiments of the scissor sheath of the present invention, but these embodiments are for illustration only, the patent application is not limited to this structure.

FIGS. 1 to 7 show the preferred embodiments of said scissor sheath, including a sheath 10 and a support frame 20, wherein the sheath 10 is used for sheathing the working part 91 of a scissor 90. The sheath 10 is a shell-like structure with a chamber 11 formed inside. The chamber 11 extends to the back end of the sheath 10, so that the working part 91 is inserted into the chamber 11 from the back end of the sheath 10. The sheath 10 has two side parts 12, the side parts 12 are opposite to each other and located on both sides of the chamber 11 respectively. Each side part 12 forms a chute 13, and the chutes 13 extend to the outer side of the side parts 12 far from the chamber 11 respectively to open to the outside. The chutes 13 extend to the back edge of the side parts 12 respectively. The chutes 13 penetrate through the side parts 12 respectively.

The support frame 20 comprises a base 21, two support arms 22 and two pins 23. The base 21 connect the support arms 22, the support arms 22 are laterally opposite to each other. The pins 23 are connected to the support arms 22 respectively. The pins 23 are laterally opposite to each other, and the pins 23 are oppositely close to each other.

The pins 23 enter the chutes 13 respectively, so that the sheath 10 is erected on the top edge of an installation surface 93, and the support frame 20 leans against the installation surface 93 to support the sheath 10. The installation surface 93 can be the top of a work table or a display table.

The pins 23 can move forward from the back end of the side parts 12 respectively to enter the chutes 13, and the pins 23 can be inserted into the chutes 13 from the outer side of the side parts 12 respectively.

To arrange the scissor 90 in the sheath 10, the working part 91 enters the chamber 11 from the back end of the sheath 10, the sheath 10 provides protection for the working part 91, and prevents the working part 91 from pricking or cutting the user, the operating part 92 of the scissor 90 is exposed on the backside of the sheath 10, when the sheath 10 is arranged on the installation surface 93, the front end of the sheath 10 contacts the installation surface 93, the base 21 abuts on the installation surface 93, the support arms 22 underprop the sheath 10, so that the support frame 20 supports the part of the sheath 10 close to the back end, and the sheath 10 firmly forms an upright installation state above the installation surface 93, it is unnecessary to dynamically overturn the scissor 90. The two sides taking a large proportion of the surface area of the operating part 92 and the side parts 12 taking a large proportion of the surface area of the sheath 10 can be observed visually in static display state. The present invention can improve the static display effect of the scissor 90, the exterior of the sheath 10 can be provided with various decorative patterns or shapes as required (not shown in the figure), and the decorative patterns or shapes can be fully displayed.

The support frame 20 forms two bulges 24. The bulges 24 laterally abut on the outer side of the side parts 12 far from the chamber 11 respectively. The number of the bulges 24 can be increased as required. The figures show that the support frame 20 has four bulges 24, and the bulges 24 are arranged in pairs.

When the support frame 20 is in a free state without any stress, the distance between the bulges 24 is shorter than the distance between the outer sides of the side parts 12 far from the chamber 11. Therefore, when the pins 23 enter the chutes 13, the side parts 12 make the bulges 24 act in reverse, the reverse actuation of the bulges 24 makes the support arms 22 deform elastically, the support arms 22 provide elastic recovery force respectively, making the bulges 24 tightly abut on the side parts 12, and the pins 23 will not easily slide away from the chutes 13, the bonding strength of the support frame 20 and the sheath 10 is enhanced. Said unstressed free state of the support frame 20 refers to the state where the support arms 22 are free from laterally opposite extrusion force or reverse tension force.

The side parts 12 form a first slot wall 14 and a second slot wall 15 respectively, the first slot walls 14 are located on the top edge of the chutes 13 respectively, and the second slot walls 15 are located on the bottom edge of the chutes 13 respectively.

The first slot walls 14 and the second slot walls 15 restrict the top edge and bottom edge parallel with each other of the opposite pins 23. Therefore, the first slot walls 14 restrict the pins 23 in combination with the opposite second slot walls 15 respectively, so that the support frame 20 cannot rotate against the sheath 10, the steadiness of the sheath 10 upright arranged on the installation surface 93 is improved. The pins 23 have a top surface 25 and a bottom surface 26 parallel with each other respectively, the top surfaces 25 and the bottom surfaces 26 are planes, and the top surfaces 25 and the opposite bottom surfaces 26 are parallel to each other.

Figure 5:
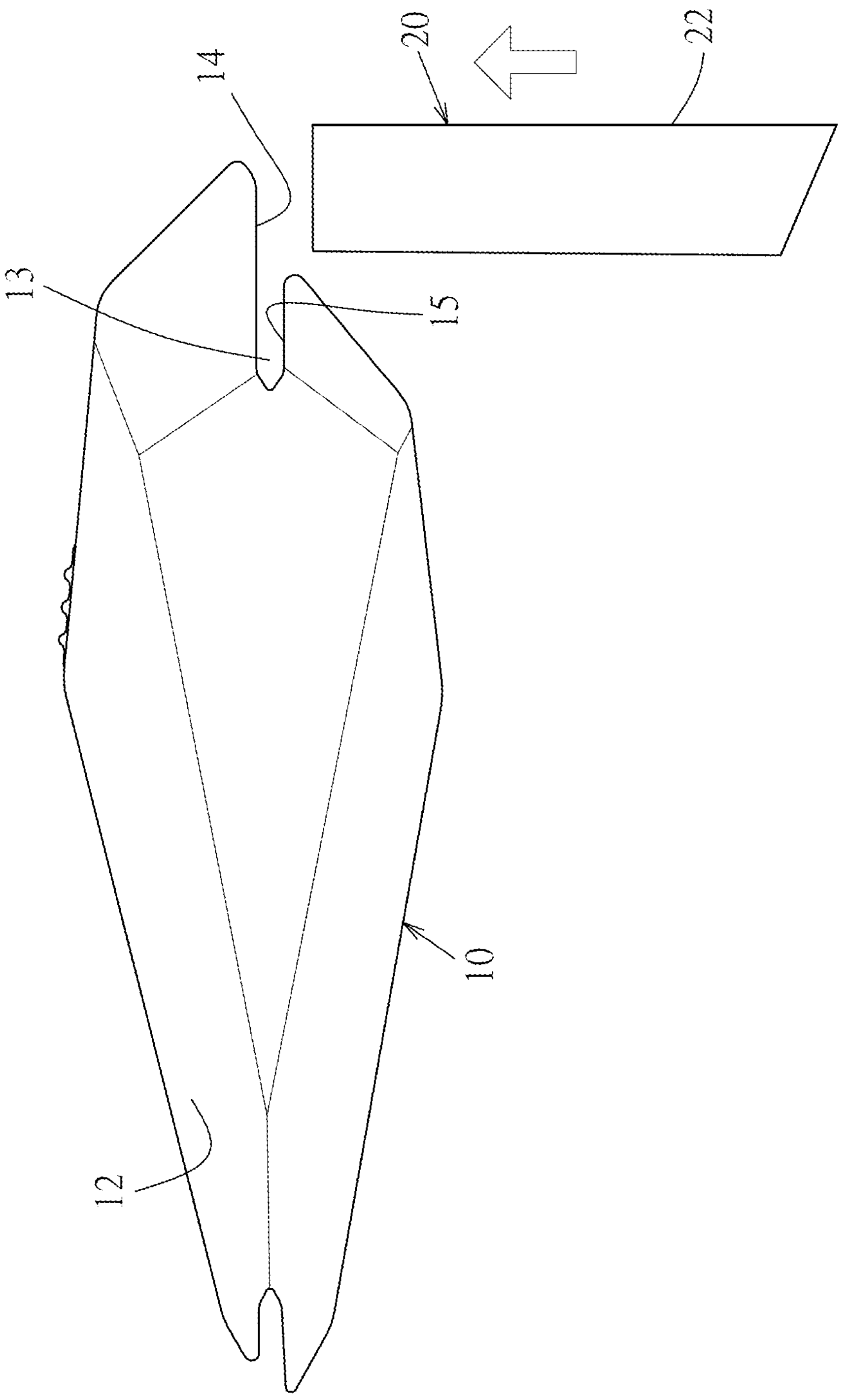
FIG. 5 is a side view of combination operation state in a preferred embodiment of the present invention.
Figure 6:
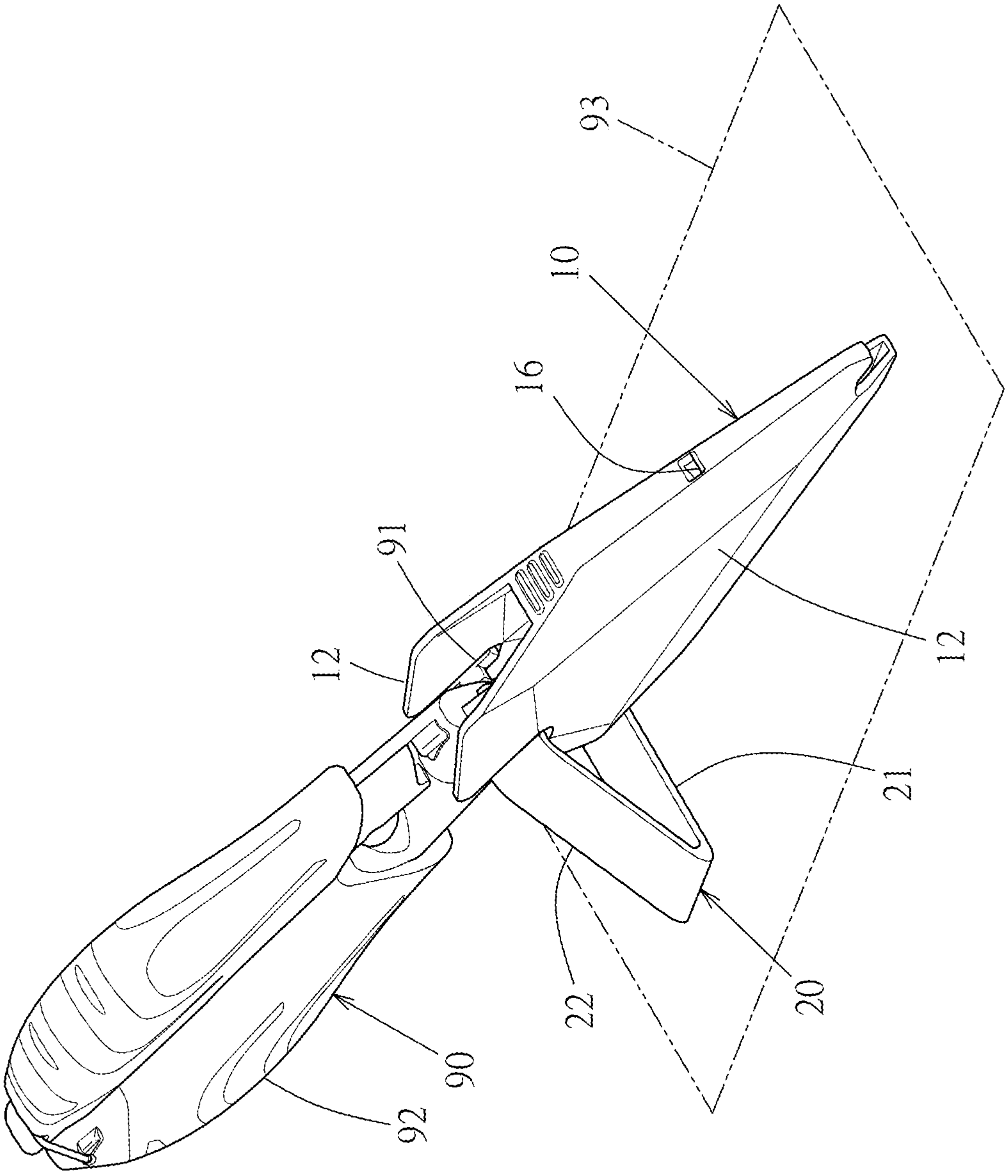
FIG. 6 is a stereogram of the operating state in a preferred embodiment of the present invention.

The corresponding range of the upward projection of the second slot walls 15 corresponding to the backward extended protrusion of the first slot walls 14 is shown in FIG. 5. When the sheath 10 is assembled with the support frame 20, the pins 23 can abut on the first slot walls 14 from bottom to top respectively, the first slot walls 14 respectively guide the pins 23 to slide forward into the chutes 13, the convenience of assembly of the sheath 10 and the support frame 20 is improved.

Figure 7:
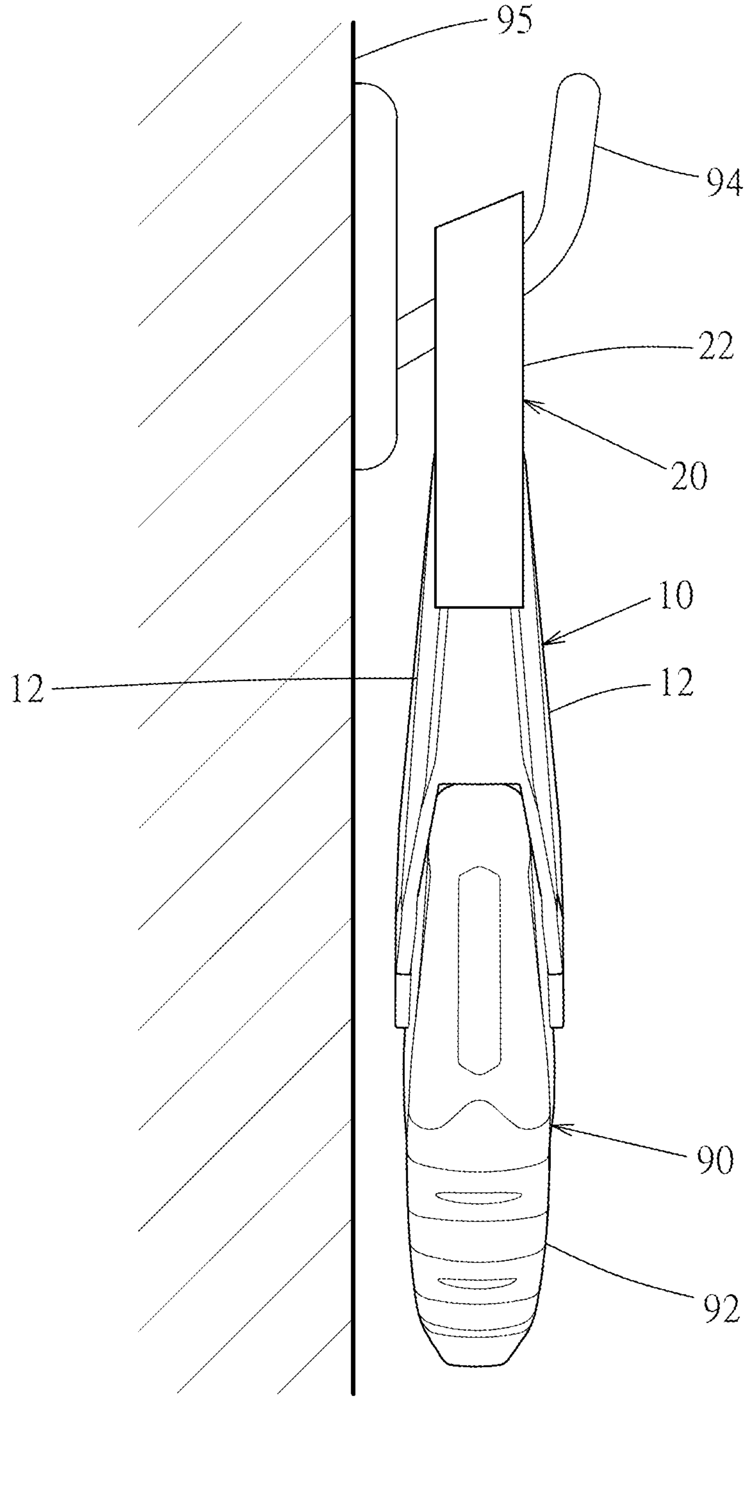
FIG. 7 is the side view of another operating state in a preferred embodiment of the present invention.

The sheath 10 forms two sockets 16, the sockets 16 are close to the front end of the sheath 10 respectively, and the sockets 16 are opposite to each other. Therefore, the pins 23 may not be inserted into the chutes 13, and the pins 23 can be inserted into the sockets 16 respectively. The operating state shown in FIG. 7 is selected. The support frame 20 is hung on a hook 94, and the hook 94 is arranged on a vertical plane 95. The sockets 16 penetrate through the sheath 10 respectively. The sockets 16 can be replaced by blind holes not penetrating through the sheath 10.

The sheath 10 is provided with a positioning structure 17 inside. The positioning structure 17 is used for chucking and positioning the working part 91. The positioning stability of the working part 91 inside the sheath 10 is improved. The positioning structure 17 is an existing technology which is easy to occur to the persons of the technical field, the specific construction of the positioning structure 17 will not be elaborated.

An extension part 27 laterally protrudes from the pins 23 respectively. The extension parts 27 are oppositely close to each other.

The chutes 13 do not penetrate through the side parts 12 respectively, so as to form a transformation implementation option based on the preferred embodiment, wherein the chutes 13 are formed by connecting a first slot section (not shown in the figure) to a second slot section (not shown in the figure) respectively. The first slot sections extend to the back side of the side parts 12 respectively, and the second slot sections extend to the front end of the chutes 13 respectively. The depth of the second slot sections is larger than the depth of the connected first slot sections. The pins 23 slide in the first slot sections from the back to the front respectively, and slide in the second slot sections along the first slot sections, based on the spatial composition that the depth of the second slot sections is larger than that of the first slot sections, the side parts 12 block the pins 23 from sliding out of the chutes 13 respectively, the pins 23 in the second slot sections are unlikely to slide backwards to enter the first slot sections, the positioning stability of the pins 23 is improved.

The pins 23 form a first circular surface (not shown in the figure) and a second circular surface (not shown in the figure) respectively, wherein the first circular surfaces are connected to the front edge and side edge of the pins 23 respectively, and the second circular surfaces are connected to the side edge and back edge of the pins 23 respectively.

When the pins 23 slide in the chutes 13 respectively, the first circular surfaces contact the back edge of the side parts 12 respectively, the relative force of the side parts 12 on the pins 23 coordinates with the shape of the first circular surfaces, so that the side parts 12 form a lateral pushing force component on the pins 23 respectively. As such, the user does not need to operate the support arms 22 to flare in reverse, the pins 23 can easily enter the first slot sections, and the handiness of the pins 23 in entering the chutes 13 is improved.

When the pins 23 slide away from the second slot sections respectively, the formation of the second circular surfaces can guide the pins 23 to act in reverse and enter the first slot sections respectively, improving the handiness of the pins 23 in leaving the chutes 13.

We claim:

1. A scissor sheath assembly comprising:

a sheath adapted to sheath a working part of a scissors, said sheath having a shell with a chamber formed therein, the chamber extending to a back end of said sheath such that the working part of the scissors is insertable into the chamber from the back end of said sheath, said sheath having a pair of side parts that are opposite to each other and are located respectively on opposite sides of the chamber, each of the pair of side parts defining a chute, the respective chutes extending toward an outer side of the pair of side parts away from the chamber, the chute opening exterior of the sheath, the chutes respectively extending to a back edge of the pair of side parts; and a support frame having a base and a pair of support arms and a pair of pins, the base connecting the pair of support arms, the pair of support arms being laterally opposite to each other, the pair of pins being respectively connected to the pair of support arms, the pair of pins being laterally opposite each other, the pair of pins respectively entering the chutes such that said support frame supports said sheath.

2. The scissor sheath assembly of claim 1, wherein said support frame has a pair of bulges, the pair of bulges laterally abutting the outer side of the pair of side parts respectively away from the chamber, wherein a distance between the pair of bulges is less than a distance between the outer sides of the pair of side parts, said pair of support arms being elastically deformable.

3. The scissor sheath assembly of claim 1, wherein the pair of side parts each define a first slot wall and a second slot wall, the first slot wall being positioned at a top edge of the chute, the second slot wall positioned at a bottom edge of the chute, the first slot wall extending rearwardly so as to protrude from the second slot wall such that the first slot walls guide the pair of pins in the chutes.

4. The scissor sheath assembly of claim 1, wherein the pair of side parts each define a first slot wall and a second slot wall, the first slot wall positioned at a top edge of the chute, the second slot wall located at a bottom edge of the chute, wherein the first slot wall and the second slot wall restrict a top edge and a bottom edge of the pair of pins from rotating against the sheath.

5. The scissor sheath assembly of claim 1, wherein the chutes respectively extend through the pair of side parts.

6. The scissor sheath assembly of claim 1, wherein the pair of side parts respectively block the pair of pins from sliding out of the respective chutes.

7. The scissor sheath assembly of claim 1, wherein the pair of pins respectively define a first circular surface, wherein the first circular surface is connected to a font edge and a side edge of the pair of pins.

8. The scissor sheath assembly of claim 1, further comprising:

an extension part that laterally protrudes respectively from the pair of pins.

9. The scissor sheath assembly of claim 1, wherein said sheath defines a pair of sockets, the pair of sockets being adjacent to a front end of said sheath.

* * * * *